United States Patent [19]

Darish

[11] Patent Number: 4,822,080
[45] Date of Patent: Apr. 18, 1989

[54] ROTATABLY ADJUSTABLE PIPE JOINT/COUPLING SEAL

[76] Inventor: Joseph J. Darish, R.D. No. 1, Country Hill Rd., Lebanon, N.J. 08833

[21] Appl. No.: 34,064

[22] Filed: Apr. 2, 1987

[51] Int. Cl.⁴ .............................................. F16L 43/00
[52] U.S. Cl. ..................................... 285/179; 285/184; 285/212
[58] Field of Search ............... 285/211, 212, 220, 179, 285/192, 175, 184, 89, 348

[56] References Cited

U.S. PATENT DOCUMENTS

| | | |
|---|---|---|
| 2,342,425 | 2/1944 | Parker . |
| 2,343,235 | 2/1944 | Bashark . |
| 2,413,878 | 1/1947 | Maky ................................... 285/220 |
| 2,759,743 | 8/1956 | Bloom . |
| 3,101,206 | 8/1963 | Franck . |
| 3,240,515 | 3/1966 | Schmohl ............................. 285/212 |
| 3,498,644 | 3/1970 | Davies et al. .................... 285/220 X |
| 4,068,863 | 1/1978 | Lasko . |
| 4,252,346 | 2/1981 | Sundholm ....................... 285/179 X |

FOREIGN PATENT DOCUMENTS 43929  3/1966  German Democratic Rep. .................... 285/212

*Primary Examiner*—Dave W. Arola
*Attorney, Agent, or Firm*—Kenneth Watov

[57] ABSTRACT

A pipe joint for mating with a standard S.A.E. port includes at its outermost portion standard S.A.E. threads, an innermost threaded portion for receiving a nut, an annular groove between the innermost and outermost threaded portions for receiving a back-up washer adjacent the nut, and an "O"-ring between the washer and outermost threaded portion.

16 Claims, 4 Drawing Sheets

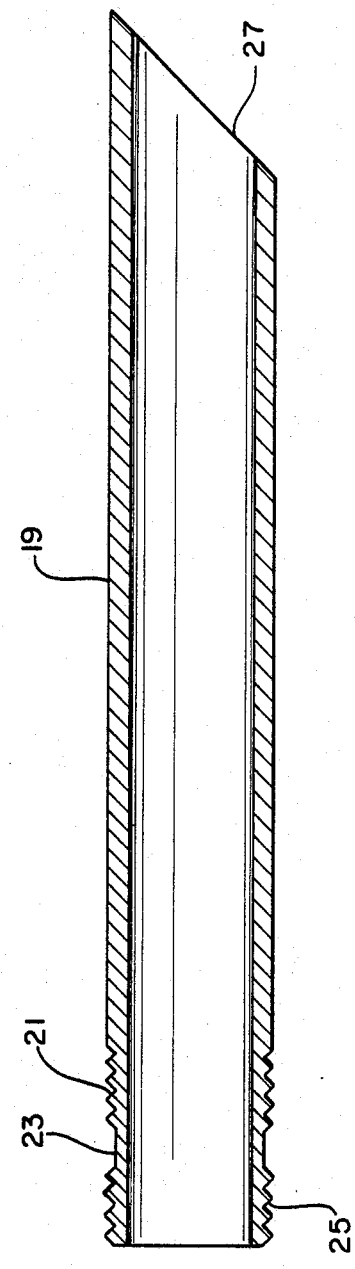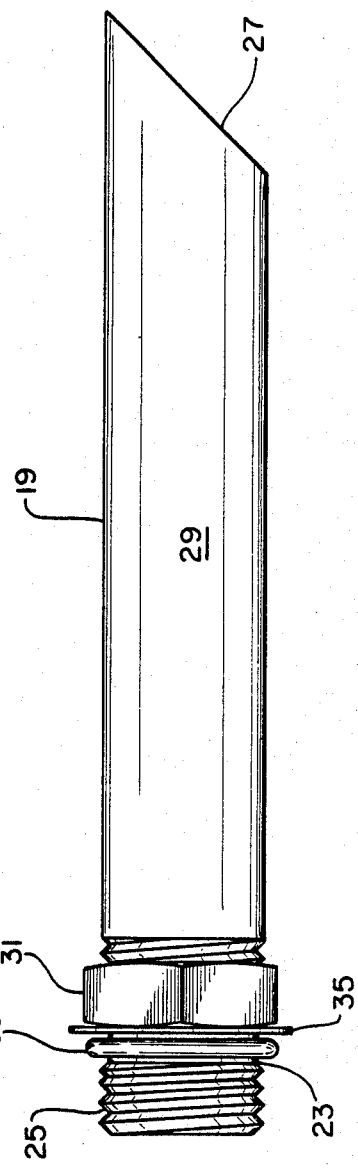

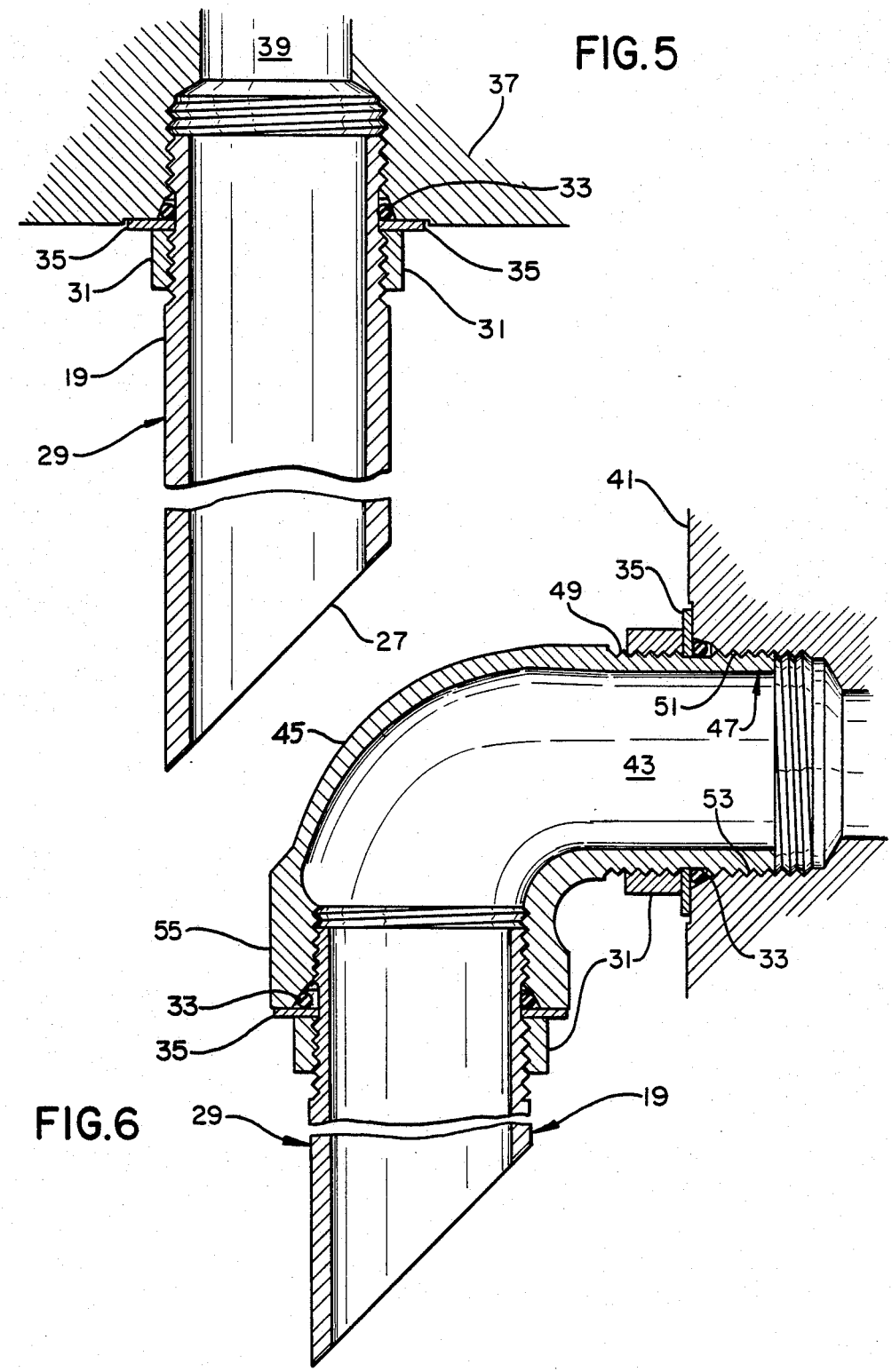

ROTATABLY ADJUSTABLE PIPE JOINT/COUPLING SEAL

FIELD OF THE INVENTION

The present invention relates generally to pipe joint and pipe coupling joint seals, and more particularly to an adjustable pipe joint seal for use on straight pipes or pipe elbow or other fittings, typically for use in connecting to the low pressure side of hydraulic pumps, manifolds, or fittings in a leak-free manner with freedom of alignment.

BACKGROUND OF THE INVENTION

In the prior art, there are many known methods and pipe fitting designs for connecting pipes to the various ports of industrial hydraulic pumps and manifolds to their associated reservoirs, for example. Such known arrangements often are provided by two or three-piece assemblies, including tapered pipe threads to attempt a leak-free seal. The prior pipe fittings are often associated with overcoming the problem of combining the industry standard S.A.E. "O"-Ring ports of various apparatus with standard American pipe and tubing.

Many of the prior fittings seek to provide methods of connection in hydraulic systems that use readily available adapters, pipes, and tubing. For example, as shown in FIG. 1, one known method incorporates an S.A.E. "O"-Ring by socket weld adapter 1 secured by a weld 3 over the end of a pipe or tubing 5. Typical practice is to test the assembly for leaks after welding, followed by pickling and cleaning of the assembly. The assembly is then installed via the threaded portion 7 of the adapter to a pump or manifold, and thereafter marked to align the bottom of the pipe or tubing 5 that is typically cut at a 45° angle, thereby "customizing" the assembly to the apparatus in which it is installed. As a result, the prior assembly of FIG. 1, being custom fit to the apparatus in which it is installed, must be altered or marked for realignment if the apparatus is changed in the field. Note the use of an "O"-ring 6 on the annular groove 8 to provide a fluid sealing means.

As shown in FIG. 2, another common practice in the industry is to use a standard S.A.E. "O"-ring by taper pipe threaded adapter 9 combined with a taper threaded end 13 of pipe 11, with a sealing compound previously applied to the threads thereof, screwed into the female threaded end 15 of the adapter 9. The mated pipe 11 and adapter 9 are then coupled or installed on a pump or manifold via the male threaded end 17 of the adapter 9. The pipe 11 is tightened to a point where its bottom portion or bottom end (assuming a 45° slant at the other end of pipe 11) is aligned in the direction of the particular fluid flow that is to be sucked into pipe 11, in this example. When apparatus is changed in the field, the assembly of the adapter 9 and pipe 11 must be altered to realign the assembly to the new apparatus. Note that a fluid sealing means is provided by mounting on annular groove 16 an "O"-ring 18.

In normal practice, the prior S.A.E. by socket weld adapter fitting 1 of FIG. 1, and S.A.E. by N.P.T. adapter fitting 9 of FIG. 2 are supplied by manufacturers thereof with thick or heavy walls in order to accommodate use for high pressure industrial hydraulic applications. As a result, such fittings 1, 9 may be modified by boring out their inside diameters to make the fittings 1, 9 have thinner walls, for use in low pressure hydraulics with maximum inside diameters to enhance fluid flow. The practice of remachining the fittings 1 and 9 adds to the expense of the use of such fittings for low pressure applications.

Parker U.S. Pat. No. 2,342,425, shows a pipe joint or coupling including a rubberized ring gasket 10 mounted on the threaded coupling end of a an elbow fitting 4 and compressively captivated between an inclined wall 11 of a projecting boss 2 of a mating port in a similar inclined wall 12 of a nut 8. A similar arrangement, is shown in Bashark U.S. Pat. No. 2,343,235, using different profiles for the inclined walls of the nut and port between which the rubberized sealing ring is held captive in compression for providing a leak-free seal.

Franck U.S. Pat. No. 3,101,206 shows the use of a nut 1 provided on an inner threaded portion of an end of a fitting, where the nut has downwardly projecting thin wall members 14 and 25 for providing an annular cavity for captively retaining a resilient sealing ring 14 on a flat sealing groove or inner end portion 20 of the fitting or elbow 12. After the outer threaded end portion 19, which is adjacent the sealing groove 20, is screwed into a port 11, as shown in FIG. 2, the nut is turned to move the captive sealing ring 14 and protruding deformable portion 25, 29 of the nut 13 into engagement with an inclined wall portion of the port means 11, for providing a fluid seal.

In Lasko U.S. Pat. No. 4,068,863, a pipe joint is shown for a non-industry standard application. It shows a mechanical pipe joint including a length of metal pipe having an annular external groove in one end portion, a compression ring disposed in the annular groove, and a compressible packing ring surrounding the end portion of the pipe. A companion pipe fitting part is provided having a bore in which the pipe end, the compressible packing ring and the compression ring are received. The tightening of a compression nut mounted on the companion pipe fitting causes shifting of the compression ring in the annular groove on the end of the metal pipe, in turn causing compression of the packing ring and a resultant seal between the outer surface of the metal pipe in the bore of the companion pipe fitting. Such an arrangement for a pipe fitting sealing mechanism is relatively expensive, and complicated by the increased parts count.

Bloom U.S. Pat. No. 2,759,743 teaches the use of a jam nut 18 provided with a rigid annulus 19 on its lower face for axially compressing a leather annulus 21 against an "O"-ring 17, for providing a fluid-type seal between the port of a boss 11 and the hydraulic fitting member 10.

In general, to reduce leakage between fittings, pipes, and ports of appparatus such as hydraulic pumps, some combination of an S.A.E. "O"-ring are typically utilized. Many high-pressure fittings and accessories are available for effecting such leakage-free coupling, but such fittings are not readily adaptable for low-pressure usage. Accordingly, low-pressure lines, such as pipes used for suction lines, are often connected to pumps using a customized and often haphazard arrangement of N.P.T. to S.A.E. adapters, pipes with tapered pipe threads, welded assemblies, and so forth as previously indicated.

On typical hydraulic power units with variable volume axial piston pumps, the low pressure inlet ports typically are horizontally oriented relative to the pool of fluid to be sucked into the pump. Accordingly, some type of elbow fitting or coupling fitting is required for connecting the vertically oriented suction pipe to the inlet port. Contrary to this, typical variable volume vane pumps typically include vertically oriented suction ports, only requiring a straight suction line to be connected between the inlet port of the pump and the pull of fluid to be sucked through the pipe into the pump. As previously indicated, the majority of available fittings and couplings for use with such low pressure pumping applications are either complicated assemblies requiring many piece parts, unreliable, unduly expensive, or only applicable as customized assemblies for use with a given pump apparatus. Many prior pipe fittings or couplings are prone to leakage, and may fail to provide sufficient flow area for fluid, resulting in undesirable pump cavitation.

SUMMARY OF THE INVENTION

With the problems of the prior art in mind, the objects of the subject invention are as follows.

An object of the invention is to provide an improved low-pressure fitting for connecting a pipe to a pump port or manifold in a leak-free manner with the maximum possible flow area for fluid through the fitting to the pump.

Another object of the invention is to provide a pipe fitting or coupling for a pipe to the low pressure intake port of a pump or manifold in a leak-free manner with maximum flow area or inside diameter for the fitting and pipe for substantially reducing the possibility of pump cavitation.

Yet another object of the invention is to provide a pipe fitting or coupling for maintaining alignment of the suction pipe or line to the associated pump port, for substantially reducing vibration and noise, and premature failure of the sealing bushing on the reservoir.

Still another object of the invention is to provide a pipe fitting or coupling permitting 360° alignment of a pipe coupled to a pump port or manifold.

Another object of the invention is to provide a pipe coupling or fitting for low pressure hydraulic applications that offers increased reliability, ease of manufacture, and reduced expense.

Yet another object of the invention is to provide a pipe fitting or coupling for mating with standard S.A.E. "O"-ring ports of pump apparatus or manifolds without requiring modification of either the fitting or the port.

In summary, these and other objects are accomplished by the present invention including a pipe joint or coupling having at one end an inner threaded portion for receiving a nut, standard S.A.E. threads at the outermost portion of the end of the joint or coupling, annular groove means for receiving an "O"-ring located between the innermost and outermost threads, and back-up washer means captively mounted on the annular groove means between the nut and an "O"-ring, for permitting the nut to be tightened against the back-up washer means for compressing the "O"-ring against the "O"-ring groove for a standard S.A.E. "O"-ring port after the end of the fitting has been screwed into the port, thereby effecting a fluid-type seal. The fitting arrangement is applicable for use on an end of an elbow fitting for coupling a straight pipe to such a horizontal port, whereby the other end of the elbow provides a standard S.A.E. "O"-ring port for receiving the end of a vertically oriented pipe, with the end of the pipe being identically configured as the other end of the elbow. Alternatively, the end of the pipe with the coupling arrangement of the present invention is matable to the standard S.A.E. "O"-ring vertical port of a pump or manifold.

The above objects are attained by providing at the end of a pipe fitting or coupling, or end of a pipe, an outermost threaded portion having standard S.A.E. threads, an intermediately located annular portion providing means for receiving a "O"-ring, the annular groove portion being followed by an innermost threaded portion for receiving a nut, with a back-up washer being captively mounted on the annular groove between the nut and the "O"-ring, whereby the outermost threads are screwed into a standard S.A.E. "O"-ring port, followed by tightening of the nut against the back-up washer for compressing the "O"-ring into sealing relation between the annular groove and a circumferential outer groove of the portion, thereby providing a leak-free connection with 360° alignment capability for the fitting.

BRIEF DESCRIPTION OF THE DRAWINGS

In the drawings, wherein like items are indicated by the same reference numeral:

FIG. 3 is a horizontal section of a first embodiment of the invention incorporated for use on a straight pipe for low pressure applications.

FIG. 4 is a pictorial view of the fully assembled embodiment of the invention including the pipe embodiment of FIG. 3.

FIG. 5 is a vertical section view of the embodiment of the invention of FIG. 4 mated to the standard S.A.E. "O"-ring port of a pump body or manifold block or fitting.

FIG. 6 is a vertical section view of another embodiment of the invention for providing an elbow fitting with a relatively large inside diameter for connecting the pipe of FIG. 4 at an angle to a standard S.A.E. "O"-ring port of a pump body or manifold or fitting.

DETAILED DESCRIPTION OF THE PREFERRED EMBODIMENTS OF THE INVENTION

Figure 1:
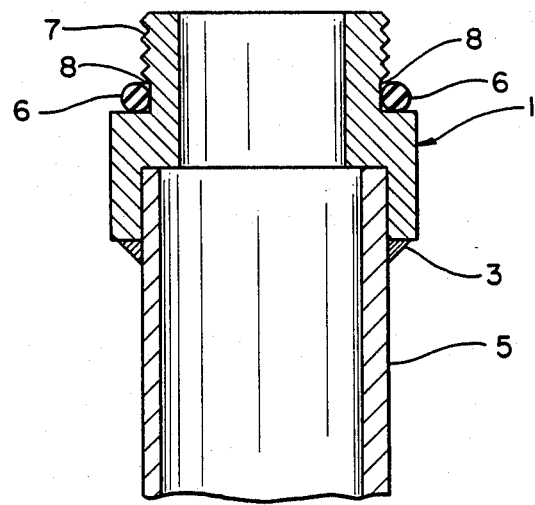
FIG. 1 is a vertical section of a prior art S.A.E. by socket weld adapter fitting mounted on a pipe.
Figure 2:
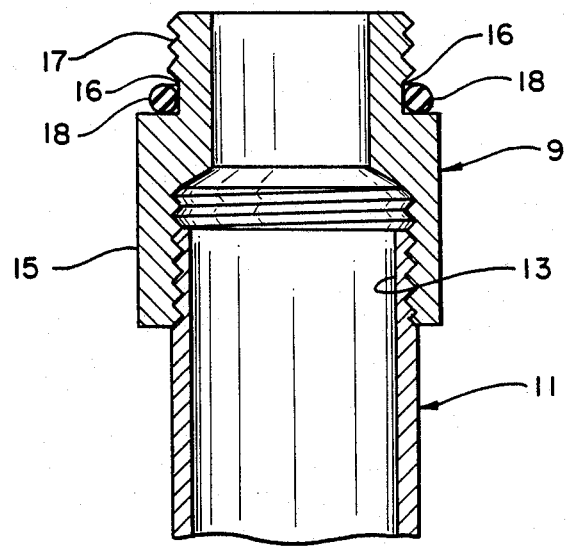
FIG. 2 is a vertical section of a prior art S.A.E. by M.P.T. adapter fitting screwed on the end of a taper threaded pipe.

With reference to FIGS. 3 and 4, a first embodiment of the invention provides a straight pipe assembly 29 for mating with a standard S.A.E. "O"-ring port configuration. The assembly 29 includes a relatively thin walled pipe 19 having a relatively large inside diameter. In this example, the left end of the pipe includes an innermost standard S.A.E. threaded portion 21, an intermediately located flat annular groove 23, and a standard S.A.E. threaded portion 25 at the outermost portion of the end, as shown. The other end 27 of the pipe 19 is cut an angle to the longitudinal axis of the pipe 19. In this example, the angle α is shown as being 45°. Also, in this example, a chamfer is provided at the ends of the outermost threaded portion 25, and also at the opposite end of the annular groove 23, with the chamfer at each portion having an angle β, in this example of 45°. The suction pipe assembly 29 of this example, as shown in FIG. 4, includes a nut 31 screwed onto the innermost threaded portion 21, a "O"-ring 33 mounted on the annular groove 23, and a back-up washer 35 captively mounted between the nut 31 and "O"-ring 33 on the annular groove 23.

The pipe 19 can be fabricated from any suitable material. In one application, the present inventor used a welded A120-A53 ¾ inch S.C.H. 40 iron pipe with a 1.05 inches outside diameter, and a 0.824 inch inside diameter. The pipe was pickled and oiled. Examples of other suitable materials are seamless pipe or tube of bronze, steel, plastic, or other suitable material, or welded tubing or piping. In practice, for typical applications using the present invention for pump suction lines, the S.C.H. 40 pipe can be used, for providing a very large bore in the pipe that is comparable to the bore of the S.A.E. port configuration that the pipe assembly 29 is intended to mate to. For example, on an S.A.E. 1¼ inch port, there is a 1⅞-12 thread in the "O"-ring port. An associated pipe 19 of 1¼ inch S.C.H. 40 provides a nominal 1.610 inch inside diameter to the port, the latter being much larger than used in common practice for such pipes connected to pump ports. It should be noted that a larger than nominal size pipe can be attained by swaging the end of the pipe 19 down to the next smaller size and then machining the standard S.A.E. configuration on the pipe 19 end. For example, a 1-inch S.C.H. 40 pipe can be swaged down on one end to provide approximately the inside diameter of a ¾ inch S.C.H. 40 pipe. The swaged end is then machined to a ¾ inch S.A.E. "O"-ring port configuration. In this manner, an even larger flow area is provided for fluid flowing through the pipe 19, thereby lowering the pressure drop seen by the pump.

With reference to FIG. 5, in the example of a vertically ported pump body or manifold block or fitting 37 having a port 39, the pipe assembly 29 of the present invention is screwed directly into the port as shown. Before tightening the nut 31, the slanted open end 27 of the pipe 19 is oriented typically to direct fluid flow, in applications where the pipe assembly 29 serves as a pump suction line or manifold return line. Such an application for the pipe assembly 29, although meant to be the only application of the pipe assembly 29, is a primary one to which the inventor has applied the assembly 29. After the slanted end 27 of pipe 19 is oriented as desired, the nut 31 is tightened against the back-up washer 35 in order to both lock the pipe 19 in place as oriented, and to compress the "O"-ring 33 for effecting the fluid seal between the pipe assembly 29 and port 39.

In applications where a pump body or manifold or fitting 41 is provided with a horizontal port 43, as shown in FIG. 6, another embodiment of the invention includes an S.A.E. male by S.A.E. female street elbow 45, for example. For providing the largest internal flow area for fluid (inside diameter), the present inventor used, in one example, a maleable iron casting for the elbow 45. Other suitable materials can be used such as investment cast stainless, for example. With reference to FIG. 6, the male end 47 of the elbow 45 is configured identically to the male end of the pipe 19, having an innermost threaded portion 49, an annular groove 51, and an outermost threaded portion 53. The female end 55 of the elbow 45 is machined or cast to provide a standard S.A.E. "O"-ring port for receiving the mating end of the pipe 19 of the pipe assembly 29, as shown.

The elbow 45 can be oriented to the port 43 at any desired rotational position relative to the port, that is 360° of alignment are provided, whereafter the nut 31 is tightened down for fixing elbow in position and pushing the back-up washer 35 against the "O"-ring 33, for effecting the fluid seal between the elbow 45 and port 43. The pipe assembly 29 is screwed into the female end 55 of elbow 45, properly oriented (as previously indicated, 360° of orientation are provided), and the nut 31 of the pipe assembly 29 is tightened against the associated washer 35 for locking the pipe 19 in place, and pushing washer 35 against the "O"-ring 33 for effecting the fluid seal between the pipe 19 and elbow 45.

As previously mentioned, the cast elbow 45 provides a larger inside diameter or internal passage for fluid flow in comparison to conventional high-pressure fittings. By combining both male S.A.E. with female S.A.E. configurations in one fitting, as in elbow 45, high fluid flow rates with low pressure or vacuum are attained in a leak free manner, via the configuration's use of the "O"-ring seal. Alignment problems are also completely eliminated by providing 360° of alignment for both the elbow 45 and pipe 19. In this manner, installation of suction or manifold return lines, for example, is facilitated as shown in FIG. 6, the inside diameter of the elbow at its connection to the port 41 is substantially the same as the inside diameter of the pipe 29, the latter having a substantially constant inside diameter. Also, the diameters of the male and female threads at the ends of the elbow 45 are substantially the same.

In the majority of applications contemplated by the inventor, the elbow 45 and pipe assembly 29, or pipe assembly 29 used alone, provide pump suction lines or return lines from manifolds or pump apparatus. As a result, the relatively thin wall provided at the "O"-ring annular grooves 23 of pipe 19, and 51 of elbow 45, typically are only under very low pressure or vacuum. Consequently, the wall thicknesses for the annular grooves 23 and 51, in this example, need only be of sufficient thickness to provide the necessary mechanical strength to maintain the mechanical integrity of the pipe 19 and elbow 45, respectively. In this manner, in two illustrated embodiments of the invention, the inside diameters for the fluid flow paths are maintained at the maximum practical limits, for providing a minimum pressure drop. Obviously, when using the various embodiments of the invention in higher pressure applications, heavier walled pipe or tubing 19, and elbows 45, would be required.

Figure 7A:
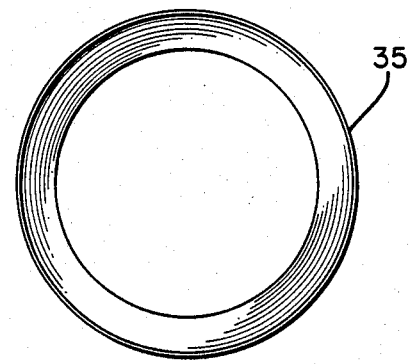
FIGS. 7A and 7B show front and side views, respectively, of a back-up washer used in the various embodiments of the invention.
Figure 7B:
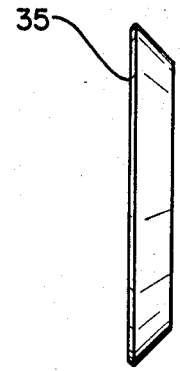
Figure 8:
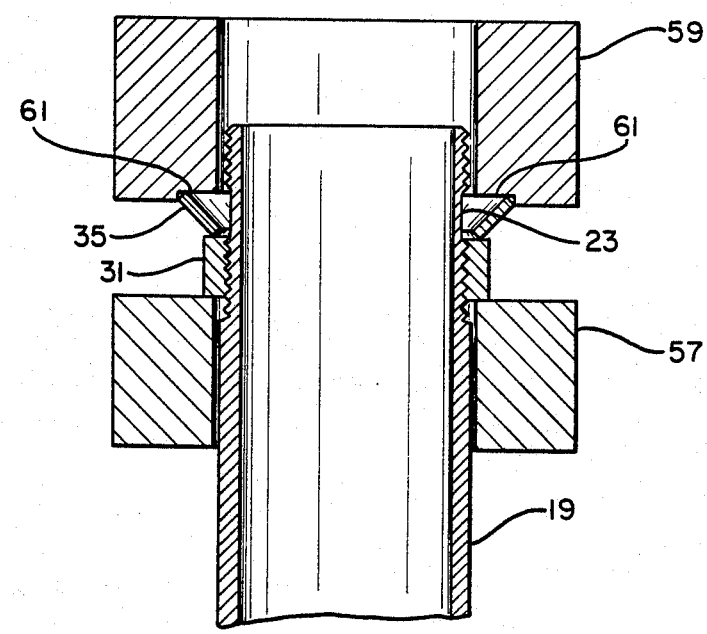
FIG. 8 shows a vertical section view of assembly tooling for captively mounting the back-up washer of FIGS. 7A and 7B on the annular groove of a fitting or coupling of the present invention.

In the present invention, as previously indicated, it is desired that the back-up washer 35 be held captive on the annular groove 23 of pipe 19, and on the annular groove 51 of elbow 45. The present inventor accomplished such captivation by using a back-up washer 35 that is initially provided in the form shown in FIGS. 7A and 7B, for the front and side views thereof, respectively (before assembly onto the pipe 19 or elbow 45). In the configuration shown, the washer has an inside diameter that is initially large enough to permit the washer to be slipped over the outermost threaded portion 25 of pipe 19 and onto the annular groove 23, where the washer is initially left to rest upon the nut 31 previously installed on the inner threaded portion 21 An assembly tool is used to flatten the washer for captivating the washer 35 on the annular groove 23, as shown in FIG. 8. As shown, the pipe 19 is inserted through a holder 57, whereby the nut 31 has a portion of its inside face resting against the top of the holder 57. A pusher member 59 having a counterbore 61 for engaging the outside circumference of the washer 35 is positioned as shown. Downward pressure is then applied against the pusher 59 for flattening washer 35. When flattened, the inside diameter of the washer 35 is reduced for holding the washer 35 captive on the annular groove 23. In a similar manner, using the same tooling, a washer 35 is captivated on the annular groove 51 of elbow 45.

Although particular embodiments of the present invention have been shown and described, and illustrated for use in particular applications, such description and use are not meant to be limiting. Various modifications, changes and improvements, and other applications may occur to those of ordinary skill in the art without departing from the spirit and scope of the present claims as given below.

I claim:

1. A pipe joint assembly for mating a pipe to a standard female S.A.E. "O"-ring port of a component comprising:
   an elbow having a standard female S.A.E. "O"-ring port at one end, and at its other end a male innermost S.A.E. threaded portion, and outermost male S.A.E. threaded portion, annular groove between said innermost and outermost threaded portions;
   a first nut threaded onto said innermost threaded portion of said elbow;
   a first backup washer captively mounted on said annular groove of said elbow;
   a first "O"-ring mounted on said annular groove between said first backup washer and said outermost threaded portion of said elbow;
   a straight pipe having at one end a male innermost S.A.E. threaded portion, a male outermost S.A.E. threaded portion, and an annular groove between said innermost and outermost threaded portions, the other end of said pipe being cut at an angle relative to its longitudinal axis for directing fluid flow;
   a second nut threaded onto said innermost threaded portion of said pipe;
   a second backup washer captively mounted on said annular groove of said pipe; and
   a second "O"-ring mounted on said annular groove between said second backup washer and said outermost threaded portion of said pipe;
   the outermost threaded portion of said elbow being threaded into said port of said component and aligned, followed by turning the first nut toward said port to push said first backup washer against said first "O"-ring and a face of said port, thereby locking said elbow in position and effecting a fluid seal via compression of said first "O"-ring;
   the outermost threaded portion of said pipe being threaded into the port of said elbow and aligned, followed by turning the second nut toward said elbow to push said second backup washer against said second "O"-ring and a face of the port of said elbow, thereby locking said pipe in position and effecting a fluid seal via compression of said second "O"-ring, the inside diameter of said elbow at said port of said component being substantially the same as the inside diameter of said pipe.

2. A pipe joint for directly mating a pipe with standard female S.A.E. port of a component, comprising:
   an end of a length of pipe having externally an outermost male S.A.E. threaded portion, an innermost male S.A.E. threaded portion, and an annular groove located immediately between said outermost and innermost threaded portion's, the other end of said pipe being void of connecting means, and having constant inner and outer diameters;
   a nut threaded onto said innermost threaded portion of said end;
   a backup washer captively mounted on said annular groove; and
   an "O"-ring mounted on said annular groove between said washer and said outermost threaded portion, whereby the outmost threaded portion is screwed into said port, the pipe is aligned, the nut is turned toward said port forcing said backup washer against said "O"-ring and a face of said port, thereby locking said pipe in position, and effecting a fluid seal via compression of said "O"-ring.

3. A pipe fitting for mating with a standard female threaded port of a component, comprising:
   an elbow having externally at one end an outermost male threaded portion, an innermost male threaded portion, and an annular groove located immediately between said outermost and innermost threaded portions:
   a nut threaded onto said innermost threaded portion of said end;
   a backup washer captively mounted on said annular groove; and
   an "O"-ring mounted on said annular groove between said washer and said outermost threaded portion, whereby the outermost threaded portion is screwed into said port, the elbow is aligned, the nut is turned toward said port for forcing said backup washer against said "O"-ring and a face of said port, thereby locking said elbow in position, and effecting a fluid seal via compression of said "O"-ring; and
   said elbow having a standard female threaded port at its other end, the diameters of the male and female threads at the ends of said elbow being substantially the same.

4. The pipe fitting of claim 3, wherein said elbow is fabricated from a maleable iron casting for obtaining the largest possible inside diameter or flow area for fluid flow.

5. In a self-connecting fluid conduit, where typically coupling members are used to connect pipes or tubing serving as fluid conduits to female threaded "O"-ring ports of components, an improvement for connecting fluid conduits directly to said ports by eliminating said coupling members, comprises:
   a length of pipe having externally at one end an outermost threaded male portion, an innermost threaded male portion, and an annular groove located immediately between said outermost and innermost threaded portions, the other end of said pipe being void of connecting means, and having constant inner and outer diameters;
   a nut threaded onto said innermost threaded portion of said end;
   a backup washer mounted on said annular groove; and
   an "O"-ring mounted on said annular groove between said washer and said outermost threaded portion, whereby the outermost threaded portion is screwed into said port, the other end of the pipe is aligned, the nut is turned toward said port forcing said backup washer against said "O"-ring face of said port, thereby locking said pipe in position, and effecting a fluid seal via compression of said "O"-ring.

6. The conduit of claim 5, wherein the other end of said pipe is cut at an angle.

7. The conduit of claim 5, wherein said pipe is fabricated from a welded iron pipe.

8. The conduit of claim 5, wherein said pipe is fabricated from a seamless pipe.

9. The conduit of claim 5, wherein said backup washer is captively mounted on said annular groove.

10. A pipe joint assembly for mating a pipe to a standard threaded female port of a component, comprising:
    an elbow having a standard female "O"-ring port at one end, and at its other end a male innermost threaded portion, and an annular groove between said innermost and outermost threaded portions;
    a first nut threaded onto said innermost threaded portion of said elbow;
    a first backup washer mounted on said annular groove of said elbow;
    a first "O"-ring mounted on said annular groove between said first backup washer and said outermost threaded portion of said elbow;
    a straight pipe having at one end a male innermost threaded portion, a male outermost standard threaded portion, and an annular groove between said innermost and outermost threaded portions;
    a second nut threaded onto said innermost threaded portion of said pipe;
    a second backup washer mounted on said annular groove of said pipe; and
    a second "O"-ring mounted on said annular groove between said second backup washer and said outermost threaded portion of said pipe;
    the outermost threaded portion of said elbow being threaded into said port and aligned, followed by turning the first nut toward said port to push said first backup washer against said first "O"-ring and a face of said port, thereby locking said elbow in position and effecting a fluid seal via compression of said second "O"-ring, the inside diameter of said elbow at said port of said component being substantially the same as the inside diameter of said pipe.

11. The pipe joint assembly of claim 10, further including said elbow having a standard port at its other end.

12. The pipe joint assembly of claim 10, wherein said elbow is fabricated from a maleable iron casting for obtaining the largest possible inside diameter or flow area for fluid flow.

13. The pipe joint assembly of claim 10, wherein said first backup washer is captively mounted on said annular groove of said elbow.

14. The pipe joint assembly of claim 10, wherein the other end of said pipe is cut at an angle.

15. The pipe joint assembly of claim 10, wherein said pipe is fabricated from any one of a family of materials including either welded iron pipe or tube, bronze pipe, steel pipe, and plastic pipe.

16. The pipe joint of claim 10, wherein said second backup washer is captively mounted on said annular groove.

* * * * *